(12) United States Patent
Hofmann et al.

(10) Patent No.: US 10,041,837 B2
(45) Date of Patent: Aug. 7, 2018

(54) RADIATION IMAGING SENSOR

(71) Applicant: FRAUNHOFER-GESELLSCHAFT ZUR FOERDERUNG DER ANGEWANDTEN FORSCHUNG E.V., Munich (DE)

(72) Inventors: Ulrich Hofmann, Itzehoe (DE); Manfred Weiss, Itzehoe (DE); Joachim Janes, Itzehoe (DE); Frank Senger, Hardenfeld (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 443 days.

(21) Appl. No.: 14/547,581

(22) Filed: Nov. 19, 2014

(65) Prior Publication Data

US 2015/0144795 A1    May 28, 2015

(30) Foreign Application Priority Data

Nov. 22, 2013   (DE) .................. 10 2013 019 560

(51) Int. Cl.
*G01J 5/06*     (2006.01)
*G01J 5/04*     (2006.01)
(Continued)

(52) U.S. Cl.
CPC .............. *G01J 5/047* (2013.01); *G01J 5/045* (2013.01); *G01J 5/084* (2013.01); *G01J 5/0806* (2013.01);
(Continued)

(58) Field of Classification Search
USPC .......................................... 250/353
See application file for complete search history.

(56) References Cited

U.S. PATENT DOCUMENTS 7,760,414 B2    7/2010  Schenk et al. ............... 359/290
2004/0200962 A1  10/2004  Ishikawa et al. ......... 250/399.04
(Continued)

FOREIGN PATENT DOCUMENTS

| GB | 2 187 551 A | 9/1987 | ............... G01J 5/44 |
| WO | WO 2008/076444 A1 | 6/2008 | ............... G01J 9/00 |

OTHER PUBLICATIONS

*Fabrication and packaging of a resonant infrared sensor integrated in silicon*; Cabuz et al.; Sensors and Actuators A, 2 (1994); pp. 92-99.

Primary Examiner — David Porta
Assistant Examiner — Carolyn Igyarto
(74) Attorney, Agent, or Firm — Renner Kenner Greive Bobak Taylor & Weber (57) ABSTRACT

The present invention relates to a radiation imaging sensor with at least one detection element, which is implemented on a substrate as a micromechanical resonator and which absorbs the radiation to be detected. The resonator is set into a resonant oscillation with an excitation device and a shift in the resonance frequency of the detection element under exposure to radiation is detected with a detection device. The radiation sensor is characterized by the fact that it comprises a scanning device with a single-axis or multi-axis tiltable scanning element. The facility to tilt the device means that the detection element can be used to detect radiation from different directions. The imaging sensor can be realized in a compact manner and be economically produced.

11 Claims, 5 Drawing Sheets

(51) Int. Cl.
*G01J 5/08* (2006.01)
*G01J 5/44* (2006.01)
*G01J 5/00* (2006.01)

(52) U.S. Cl.
CPC ........... *G01J 5/0837* (2013.01); *G01J 5/0871* (2013.01); *G01J 5/44* (2013.01); *G01J 2005/0077* (2013.01)

(56) References Cited

U.S. PATENT DOCUMENTS

2013/0170517 A1    7/2013  Duraffourg et al. .......... 374/121
2016/0252400 A1*   9/2016  Azgin ....................... G01J 5/44

* cited by examiner

RADIATION IMAGING SENSOR

TECHNICAL FIELD OF APPLICATION

The present invention relates to a radiation imaging sensor with at least one detection element which is implemented on a substrate as a micromechanical resonator and absorbs radiation to be detected, and with an excitation device, with which the detection element can be set into resonant oscillation, and a detection device with which a shift in the resonance frequency of the detection element under exposure to radiation can be detected.

Such a radiation sensor works according to the bolometer principle. Bolometers detect electromagnetic radiation by absorbing the radiation, converting it into heat and quantitatively evaluating this quantity of heat. Bolometers are used, inter alia, in thermographic cameras. As well as two-dimensional matrix systems, one-dimensional arrays and discrete single detectors also exist.

BACKGROUND ART

Known infrared radiation sensors working according to the Bolometer principle typically comprise a structured diaphragm that is thermally isolated as the detection element. The incident infrared radiation is absorbed by this diaphragm, which causes the temperature of the diaphragm to increase. The temperature increase of the diaphragm causes a change in the electrical resistance of an electrical conductor mounted thereon. The resistance change is subsequently evaluated and serves as a measure of the intensity of the radiation absorbed.

C. Cabuz et al., "Fabrication and packaging of a resonant infrared sensor integrated in silicon", Sensors and Actuators A, 43 (1994), pages 92 to 99, disclose an infrared radiation sensor working according to the Bolometer principle, in which a micromechanical resonator which absorbs infrared radiation is used on a substrate as a detection element. Depending on the infrared radiation incident on the detection element, the resonance frequency of this micromechanical resonator changes due to heating. This change in the resonance frequency is detected and used as a measure of the intensity of the radiation absorbed. The document US 2013/0170517 A1 also describes a radiation sensor working according to this principle.

For imaging radiation detection however, the arrangement of an array of such radiation sensors with a corresponding set of optics is required. Imaging infrared sensor arrays require a large amount of space however, are very expensive and can sometimes be relatively slow.

The object of the present invention consists in specifying an imaging radiation sensor which has low space requirements and can be economically produced.

DESCRIPTION OF THE INVENTION

The object is achieved with the radiation imaging sensor in accordance with claim 1. Advantageous configurations of the radiation sensor are the subject matter of the dependent claims or can be inferred from the following description together with the exemplary embodiments.

The proposed radiation imaging sensor comprises at least one detection element which is implemented on a substrate as a micromechanical resonator and absorbs the radiation to be detected, at least one excitation device, with which the detection element can be set into resonant oscillation, and at least one detection device with which a shift in the resonance frequency of the detection element under exposure to radiation can be detected. The proposed radiation sensor is characterized by the fact that it comprises a scanning device with a single-axis or multi-axis tiltable scanning element. The ability to tilt the device means that the detection element can be used to detect radiation from different directions. The scanning element can be tilted accordingly by means of a drive arrangement. The radiation sensor used is preferably fully implemented as a MEMS (Micro-Electro-Mechanical System).

In the proposed radiation sensor, a scanning element and/or a scanning device is used in order to scan a region to be imaged with the sensor in at least one axis with the detection element. This means that the size of such a sensor is reduced compared to an array-like arrangement of several detection elements as would otherwise be required. Due to the implementation of the detection element as a micromechanical resonator, the scanning device and the detection element can be advantageously realized in the most compact manner, and can preferably be integrated into a single substrate as a monolithic structure. The detection exploits the fact that given a sufficiently high mechanical quality factor of preferably greater than 100,000, a micromechanical resonator operated at resonance, which absorbs radiation, reacts with high sensitivity to extremely small variations of the intensity of the incident radiation with a slight shift in its resonance frequency. This shift in the resonance frequency is used in the proposed radiation detector as a measure of the intensity of the incident radiation to be detected.

In the proposed radiation sensor, the micromechanical resonator is set into a resonant oscillation with the excitation device, and during the measurement the oscillation frequency or the oscillation amplitude is detected with a detection device. If the excitation frequency for the micromechanical resonator is held constant in this process, a variation in the oscillation amplitude is produced as a result of the shift in the resonance frequency under exposure to radiation. This variation of the oscillation amplitude is also a measure of the shift in the resonance frequency and can therefore be invoked for the evaluation. In the preferred configuration however, the micromechanical resonator is not operated in unregulated mode with constant excitation frequency, but rather is regulated by means of a phase-locked loop. This ensures that the resonator always operates at resonance and exhibits its highest sensitivity to variations in radiation. The phase and/or frequency shift which appears at the output of the phase-locked loop, in order to adapt itself to the changed resonator characteristics under exposure to radiation, is utilized and further processed in order to generate from it an output signal proportional to the radiation intensity. The phase-locked loop for regulating the micromechanical resonator forms part of the detection device. A shift in the phase difference can be detected by means of capacitive detection, piezoresistive detection, piezoelectric detection or magnetic detection.

In one configuration of the proposed radiation sensor the scanning element is configured as a frame, on which the detection element is fixed or in which it is suspended. Tilting the scanning element causes the detection element to tilt in the same manner, so that it receives radiation from another direction accordingly. In order to increase the directional selectivity and therewith the spatial resolution of the radiation sensor, a directionally selective element such as a tube body or a lens can be arranged in front of the detection element, which limits both the direction and the solid angle under which radiation can strike the detection element, and which tilts with the detection element.

In the preferred configuration of the proposed radiation sensor, the scanning element is implemented as a micromirror, which directs the radiation to be detected onto the detection element. Depending on the tilt angle of the micromirror, radiation falls on the detection element from a different direction. The radiation can be directed onto the detection element either directly or via one or more additional deflection elements, dependent upon the arrangement of the scanning element.

The micromechanical resonator can be, e.g., a thin beam or bar, clamped either on one or both sides, made of silicon for example, which is excited into oscillation out of the plain of the substrate, for example. Possible drive methods for the excitation device include electromagnetic and piezoelectric drive methods. Preferably, the device is an electrostatic excitation arrangement, because this principle is the most economical and compact to implement. The oscillation mode of the resonator can be, for example, a torsional oscillation or a flexural oscillation out of the plain of the substrate. Other oscillation modes are also possible however, e.g. a lateral oscillation in the plain of the substrate or parallel thereto. Normally a lateral oscillation requires a greater area, however, which in the case of a matrix arrangement of multiple detection elements, therefore leads to an unfavourable filling factor. As well as flexural resonators clamped on both sides, torsional resonators clamped on both sides or other mechanical resonator structures can be used.

In an advantageous configuration, the detection element and the scanning device with the scanning element are arranged in a hermetically sealed chamber or a corresponding cavity, that can also contain a getter material. This means that a vacuum encapsulation can be achieved, by means of which a low damping of the microresonator, and therefore a high measurement sensitivity, is obtained. Possible getter materials include various highly reactive metals, such as titanium, copper or zirconium alloys. The cavity is preferably produced by a cover substrate being bonded onto the substrate with the detection element. If required, in addition another base substrate can also be bonded under the substrate with the detection element. The person skilled in the art will be familiar with a range of bonding methods and production methods for producing a vacuum encapsulated microstructure in the appropriate form. The Q factor of the radiation sensitive resonator configuration will preferably be selected to be greater than 100,000.

In an advantageous extension, another non-irradiated reference sensor is arranged in the same cavity in which the detection element and the scanning device are located. This in turn comprises a corresponding detection element, a drive arrangement and a detection device. The reference sensor serves to detect the background radiation present in the chamber and to detect the temperature of the cavity or chamber. In this arrangement, information read from the sensor can be constantly interpreted relative to information from a reference sensor. In the simplest case, a simple differencing of the exit signals from the sensor and reference sensor can provide the requisite compensation of background artefacts. In a configuration of the proposed sensor in which a plurality of detection elements are irradiated in temporal sequence with the radiation to be detected using a scanning mirror as a scanning element, those detectors that are not currently being supplied with radiation via the mirror can also be used as a reference for the detector or detectors currently being illuminated. Such an arrangement is shown, e.g., in FIG. 6 of the exemplary embodiments. This illustrates a dynamic referencing. In this arrangement each detector can serve at one point as a radiation sensor and in the next moment as a reference sensor, depending on whether it is currently being irradiated due to the mirror position or not. Proceeding in this manner means that there can also be more than one reference sensor.

In a preferred configuration, the detection element and the scanning element are integrated monolithically into a common substrate. The cover substrate has an inlet window above the scanning element for the entry of the radiation to be detected and on the inside between the scanning element and the detection element it has a deflecting mirror. With the scanning element, the radiation to be detected is directed onto the detection element via the deflecting mirror.

For many applications, it is necessary for the sensor to react as quickly as possible to a change in radiation. This can be facilitated for these cases by a particularly high resonance frequency of the micromechanical resonator, which lies in the range from 100 kHz up to 100 MHz, being selected. The higher this resonance frequency, the faster the sensor can react.

The scanning element, which in an advantageous configuration is integrated monolithically with the detection element on the same substrate, can either be pivoted in resonant mode about the one or more axes about which it can be tilted and driven, or else positioned in a quasi-static manner for the scanning. A corresponding control unit ensures that the radiation detection is synchronized with the mechanically spatial tilting of the scanning element. In this manner, depending on the design of the scanning device, a 1D-, 2D- or 3D-coordinate set can be assigned to each item of information that is obtained by the radiation detection at a certain moment. The image processing can finally take place in a suitable arithmetic unit, e.g. on a computer.

The proposed radiation sensor can also comprise a plurality of detection elements, e.g. in a matrix-like or array-like arrangement, with respectively assigned excitation devices and detection devices. In one configuration, the directional selection via the scanning device can be achieved by integration of the entire array into the scanning element, or in another configuration by illumination of the entire array with a scanning element implemented as a mirror. With such an arrangement of a plurality of detection elements in a row or in a two-dimensional matrix, a higher spatial resolution or also a faster imaging process can be obtained compared to a sensor with only one detection element. The radiation sensor nevertheless has a more compact construction than a radiation sensor which only uses one array of detection elements for the same imaging area. In an arrangement of a plurality of detection elements in a row or in a two-dimensional matrix, a high filling factor of the resulting resonator structure is desirable. In the case of electrostatic excitation this high filling factor is obtained particularly easily if the excitation electrodes can be arranged underneath the resonator structure. In addition the detection elements should then be separated from one another only by a narrow gap. Preferably, in order to achieve a high filling level an arrangement is selected in which all detection elements of the array are accommodated in a single vacuum cavity. For certain applications, it can also be advantageous however, to accommodate the individual detection elements, each with separate scanning devices, in their own cavity isolated from the adjacent detection element. This means that, e.g., different pixel sensitivities can be produced by means of selectively differing gas pressures within adjacent cavities.

The proposed radiation sensor should already preferably be vacuum encapsulated on wafer level. A beam-forming or imaging lens can likewise be produced in a similar manner, as is familiar from miniature cameras for mobile phones, on wafer level and also be combined with the radiation sensor on wafer level. Thus each scanning radiation sensor can be equipped already at wafer level with its own optics or its own lens.

The micromechanical resonator is preferably designed such that it absorbs infrared radiation. For numerous applications, the wavelength ranges of interest are in particular those between 3 and 5 μm and between 8 and 14 μm. An enhanced absorption of the resonator can also be obtained, e.g., by suitable coating of the resonator or in the case of a resonator made of a semiconductor, by suitable doping. Obviously the proposed radiation sensor is not limited to the detection of infrared radiation however, but rather can also be designed for the absorption and detection of electromagnetic radiation of a different wavelength range.

BRIEF DESCRIPTION OF THE DRAWINGS

The proposed radiation sensor will be explained once again in more detail hereafter, on the basis of exemplary embodiments in conjunction with the drawings. These show.

WAYS OF EMBODYING THE INVENTION

In the following, first of all an estimate of the sensitivity of a micromechanical resonator, such as can be used as a detection element in the proposed radiation sensor, is indicated. The frequency shift due to temperature induced stresses can in this case be measured very accurately with low noise, as the following remarks show.

A suitable means of providing the simplest type of resonator is a broad beam clamped on two sides and made out of highly doped polysilicon, which is mounted on a silicon wafer as the substrate. In order to obtain a high absorption of infrared radiation, the silicon of the beam must be highly doped, for example $n=10^{19}/cm^3$. On the substrate underneath the beam, drive electrodes are located, for example made of polysilicon, which are separated by an air gap and electrically isolated from the substrate by silicon oxide. The distance (gap) between beam and electrodes is, for example, about 1.5 μm in size. The electrodes are used for driving the resonator and for measuring the phase of the oscillation (PLL), and possibly the amplitude. Separate drive electrodes and detection electrodes can also be mounted.

In the case of infrared irradiation, the temperature of the several microns thick beam rises by ΔT, while the 0.7 mm thick substrate, being a heat sink, remains at room temperature. This produces compressive stress σ0~−ΔT in the beam and the resonance frequency is shifted by Δf.

For the simple beam, an analytical calculation of lowest order produces a linear relationship df~ΔT:

$$f = f_0 + \Delta f \qquad (1)$$

$$f_0 = 1.02792 \frac{h}{L^2}\sqrt{\frac{E}{\rho}}$$

$$\Delta f = 0.151582 \frac{\sigma_0}{h\sqrt{E\rho}} = -0.151582 \frac{CTE\,\Delta T}{h}\sqrt{\frac{E}{\rho}}$$

Here L and h are the length and thickness of the beam, its width b does not enter into equation (1). The material characteristics which enter into the equation are the elasticity modulus E, the density ρ and the linear thermal expansion coefficient CTE. The thermally generated stress is σ0=−E CTE ΔT. The sign convention for stress is: tensile stress is positive, compressive stress is negative.

Noteworthy here is that Δf does not depend on the length L of the beam and varies with 1/h. It seems therefore to be favourable to work with thin beams, in order to obtain a high sensitivity. For a given intensity of the infrared radiation to be detected, the heat absorbed is indeed proportional to the beam thickness, but the temperature increase ΔT thereby induced is independent of h, because the thermal currents flowing to the substrate are proportional to h.

In the silicon example the values of the material parameters are: CTE=3 $10^{-6}$/K, ρ=2350 kg/m3, E=170 GPa.

A resonance frequency f0 of 100 kHz is then obtained, for example, with h=1 μm, L=295 μm. This then results in a value for the frequency shift:

Δf=3868 [Hz/K] ΔT.

For a Q factor of 100,000 such as is obtained with a getter, it is possible in every case to detect Δf=1 Hz. That corresponds to temperature differences of less than 0.3 mK that can be resolved. Typical non-resonant micro-bolometers can resolve 50 mK. Resonant bolometers are therefore more than 100 times more sensitive than non-resonant bolometers.

In a 3 μm thick beam with f0=100 kHz, a length of 512 μm must be selected. One then obtains Δf/ΔT=1289.

The absorbed heat is dissipated to the substrate by thermal conduction. The non-stationary thermal conduction equation is given by:

$$\frac{\partial T}{\partial t} = D\nabla^2 T \qquad (2)$$

$$D = \frac{k}{c_p\rho}$$

The diffusion constant D for silicon has the value $D=10^{-4}$ m²/s. The typical time required to diffuse a section of length x is $$t = \frac{x^2}{D}$$

The absorbed heat diffuses vertically in the time $h^2/D=10^{-8}$ s=10 ns for h=1 μm.

The response time which is required in order to reach a time-independent temperature profile, is in terms of order of magnitude $$t_{response} = L^2/D$$

It has a value of L=300 μm at 1 ms. That is sufficient for, for example, 50 Hz video applications. In order to obtain shorter response times, the resonator must be chosen to be shorter. If one can reduce $t_{response}$ to 100 μs, with for example L=100 μm, more than 1000 images per second can be produced. A 1D-bolometer array could then be combined with a 1-axis mirror in order to produce a 2D-image.

Figure 1:
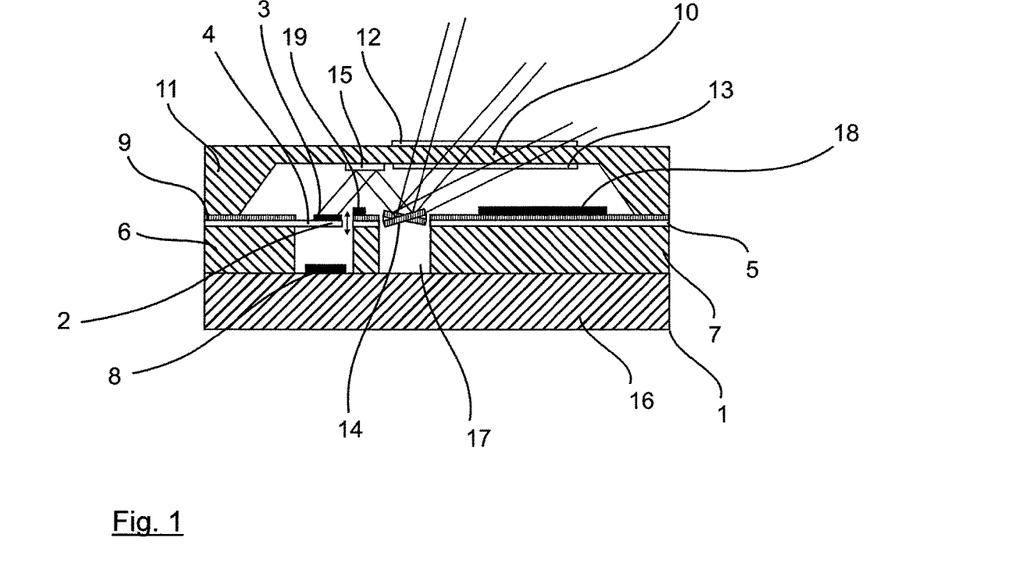
FIG. 1 a first example of a configuration of the proposed radiation sensor in cross-section.

FIG. 1 shows a first example of a configuration of the proposed radiation sensor for the detection of infrared radiation (IR radiation). The infrared radiation sensor 1 in this example has a radiation-sensitive resonator structure 2 as a micromechanical resonator or detection element, which has an absorber 3 that is mounted on a thermally and electrically insulating mechanically elastic spring structure 4. This spring structure 4 is produced from an insulation layer 5. The spring structure 4, which is capable of oscillation, is in this arrangement clamped on one side in the rigid chip frame 6 which is part of the MEMS wafer 7. The radiation-sensitive resonator structure 2 in this arrangement is set into resonance by electrostatic forces. To this end, a drive electrode 8 is located underneath the resonator structure 2. The drive electrode 8 with the control electronics, not shown, represents the excitation arrangement of the radiation sensor. If IR radiation passes through the window 10, which is transparent to the corresponding radiation, is anti-reflection coated on both sides by anti-reflection layers 12 and 13 and is a component of the cover wafer 11, then radiation also falls on the mobile MEMS mirror 14 which is either statically tilted or dynamically in motion. This is produced in this configuration from a functional layer 9 which is applied to the isolation layer 5. The incident radiation is deflected by the mobile MEMS mirror 14 onto the static deflecting mirror 15, which deflects the radiation onto the radiation sensitive resonator structure 2. The variation in the resonance oscillation induced by the radiation is detected capacitively via a sensor electrode 19 as a part of the detection device. By selective tilting, and in some cases also by resonant operation of the MEMS mirror 14, radiation of different solid angles of incidence can be imaged on the resonator structure 2 and a thermographic image of the environment can thereby be recorded sequentially, pixel by pixel. In order to create a hermetically sealed encapsulation of the resonator structure 2, a base wafer 16 is bonded against the underside of the MEMS wafer 7. A getter 18 is accommodated at a suitable place within the cavity 17 so that thermal activation of the getter creates a sufficient negative pressure environment.

Figure 2:
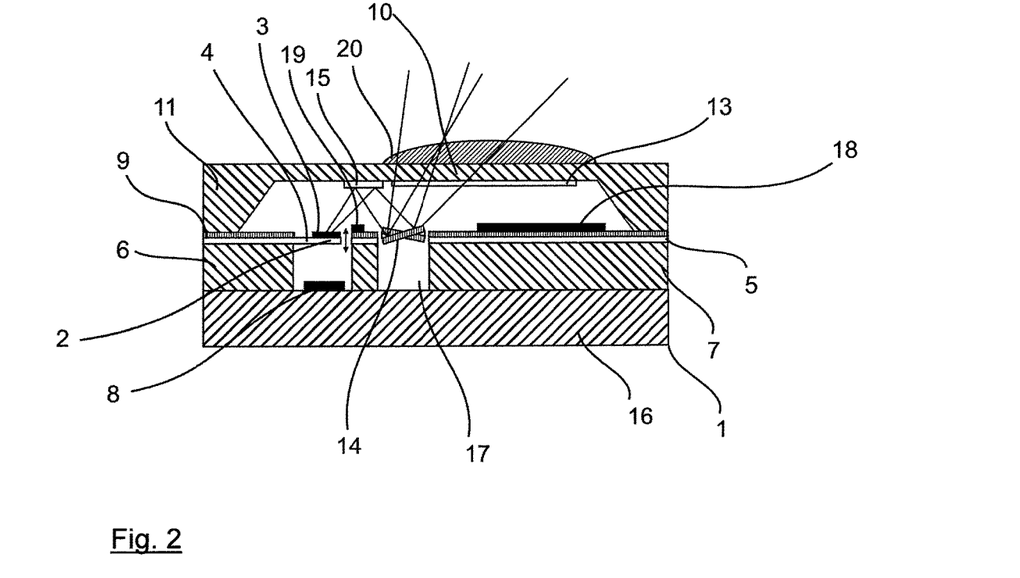
FIG. 2 a second example of a configuration of the proposed radiation sensor in cross-section.

FIG. 2 shows a further configuration of the proposed radiation sensor in cross-section. The infrared radiation sensor 1 shown in FIG. 2 again has a radiation-sensitive resonator structure 2 which has an absorber 3 mounted on a thermally and electrically insulating mechanically elastic spring structure 4. This spring structure 4 is produced from an insulation layer 5. The oscillation-capable spring structure 4 in this arrangement is clamped on one side in the rigid chip frame 6 which is part of the MEMS wafer 7. The radiation-sensitive resonator structure 2 in this arrangement is also set into resonance by electrostatic forces. To this end, a drive electrode 8 is located underneath the resonator structure 2. If IR radiation passes through the anti-reflection coated lens 20, which is transparent to the corresponding radiation, and after further travel through the window 10, which is anti-reflection coated by an anti-reflection layer 13 and is a component of the cover wafer 11, then radiation also falls on the mobile MEMS mirror 14 which is either static and tilted or dynamically in motion. This is also produced in this configuration from a functional layer 9 which is applied to the isolation layer 5. The incident radiation is deflected by the mobile MEMS mirror 14 onto the static deflecting mirror 15, which deflects the radiation onto the radiation sensitive resonator structure 2. The variation in the resonance oscillation induced by the radiation is detected capacitively via a sensor electrode 19. By selective tilting, and in some cases also by resonant operation of the MEMS mirror 14, radiation of different solid angles of incidence can be imaged on the resonator structure 2 and a thermographic image of the environment can thereby be recorded sequentially, pixel by pixel. In order to create a hermetically sealed encapsulation of the resonator structure 2, a base wafer 16 is bonded against the underside of the MEMS wafer 7. A getter 18 is accommodated at a suitable place within the cavity 17 so that thermal activation of the getter creates a sufficient negative pressure environment.

Figure 3:
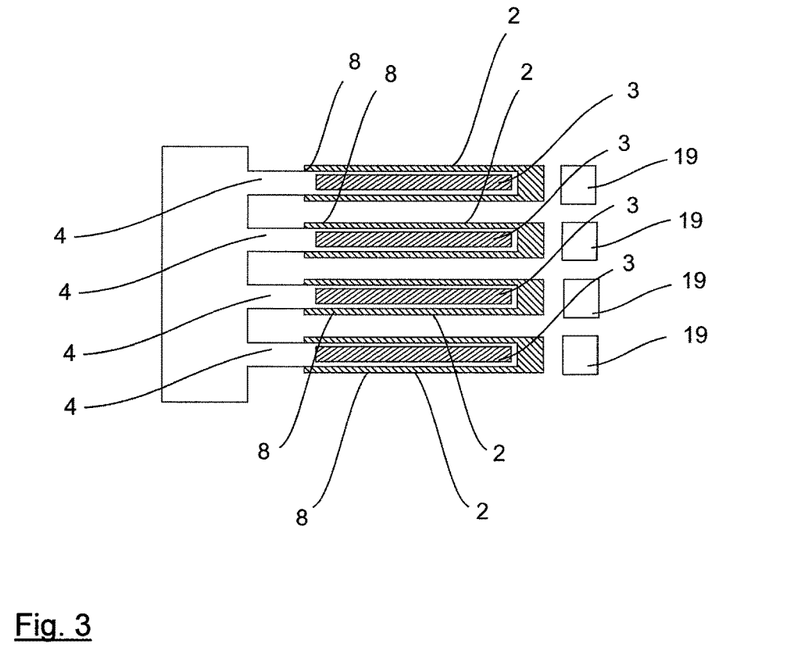
FIG. 3 an example of an array-like arrangement of individual detection elements in the proposed radiation sensor in a plan view.

FIG. 3 shows, in a plan view, an example of an array-like arrangement of detection elements as corresponding resonator structures 2, such as can be used in the proposed radiation sensor. The individual resonator structures 2 are formed by thick beams that are clamped on one side on the MEMS substrate via a spring suspension 4. In this case the beam represents the absorber 3 for IR radiation. The resonance oscillation is excited in each case by means of a drive electrode 8 arranged under the resonator structure 2. The oscillation frequency or oscillation amplitude respectively is detected via sensor electrodes 19. Each individual detection element can be individually driven and individually read out via the isolated drive electrodes 8 and sensor electrodes 19. In this manner a line-shaped array of detection elements can be realized in the radiation sensor.

Figure 4:
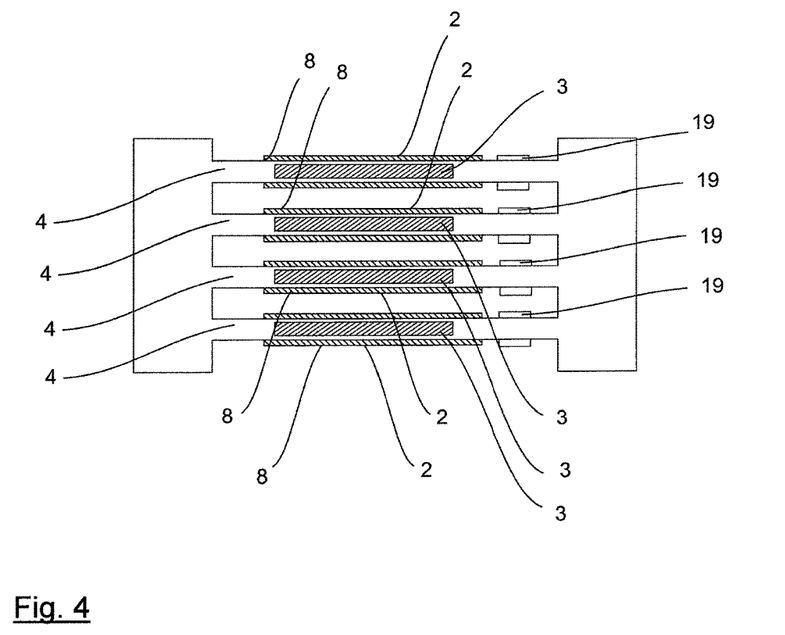
FIG. 4 a further example of an array-shaped arrangement of detection elements in the proposed radiation sensor in a plan view.

FIG. 4 shows a further possible configuration of such an array of detection elements as can be used in the proposed radiation sensor, in a plan view. In contrast to FIG. 3, in this case the resonator structures 2 are realized by beams clamped on the MEMS substrate on two sides via spring suspensions 4. Here also, a drive electrode 8 and a sensor electrode 19 are again assigned to each detection element.

Figure 5:
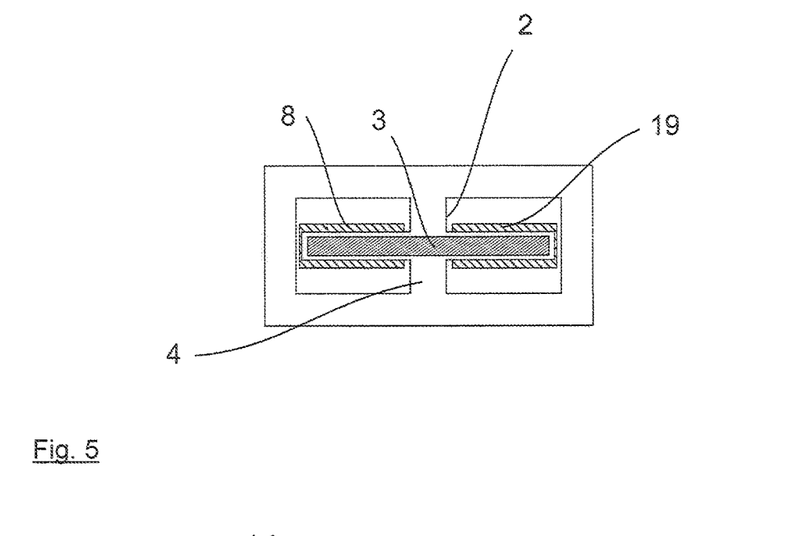
FIG. 5 an example of a resonator with a torsional suspension, such as can be used in the proposed radiation sensor as a detection element.

FIG. 5 shows an example of an alternative resonator structure 2 in a plan view. This also has either an absorber 3 implemented as a beam, which in this case is fixed to the MEMS substrate via a torsion suspension 4. The detection element can be set in resonance via a drive electrode 8, wherein the oscillation can be monitored capacitively using a sensor electrode 19.

Figure 6:
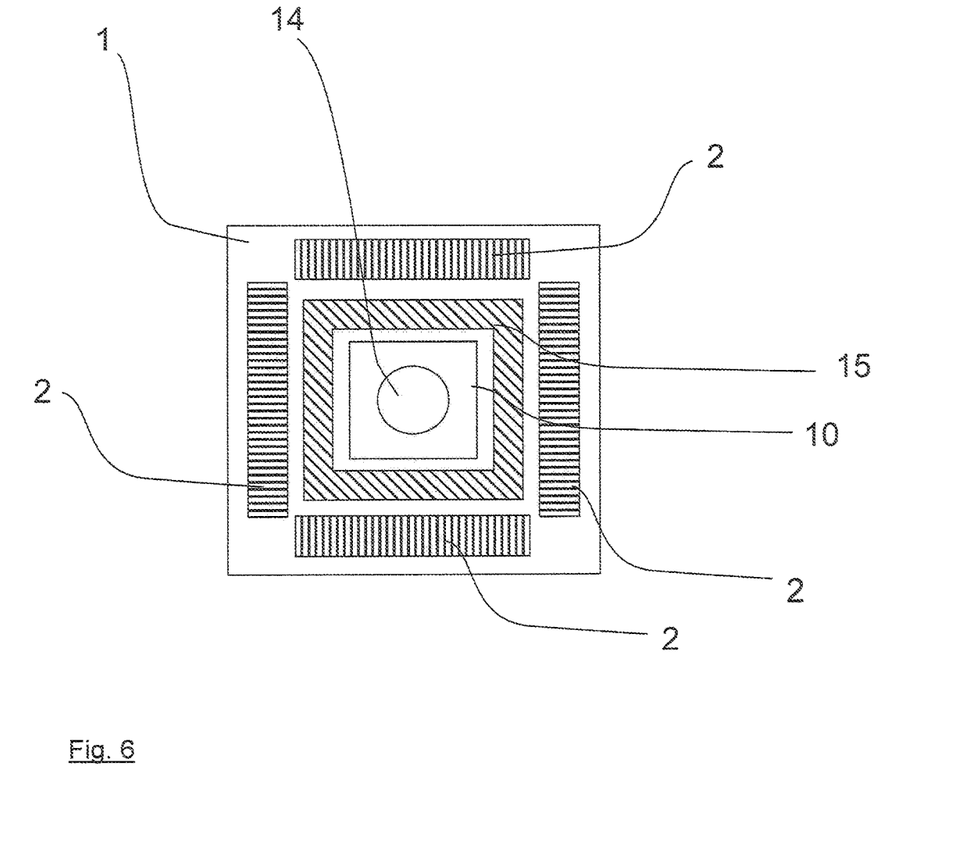
FIG. 6 a plan view of a further exemplary configuration of the proposed radiation sensor.

FIG. 6 shows a plan view of a configuration of the proposed radiation sensor. The imaging infrared radiation sensor 1 is shown here as partly transparent (viewed through the cover). The radiation passes through the window area 10 to reach the micro-mirror 14 which is moveably suspended in two axes and which constitutes the scanning element. The mirror 14 diverts the radiation towards the static deflecting mirror 15, which in turn diverts the radiation towards the array arrangements of radiation-sensitive resonator structures 2. These resonator structures 2 are only indicated schematically in the figure. The mirror 14 in this case is driven such that it illuminates the individual resonator structures 2 one after another.

Figure 7:
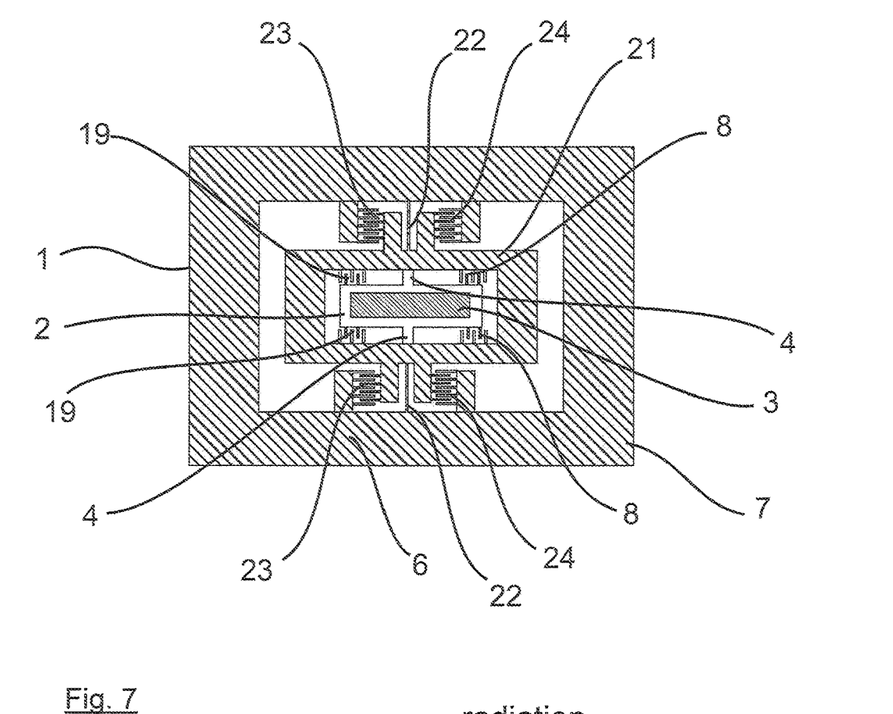
FIG. 7 a plan view of a further exemplary configuration of the proposed radiation sensor.

Finally, FIG. 7 shows an example of a further possible configuration of the proposed radiation sensor in a plan view. In this example, the resonator structures 2 are mounted on the scanning element and/or suspended or fixed thereto.

This configuration dispenses with any beam deflection by additional mirrors. The IR-sensitive resonator structure 2 with absorber 3 is moveably suspended in a frame 21 by torsional springs 4. The resonator structure 2 can be set into resonance by means of drive electrodes 8. The oscillation of this resonator structure 2 can be tracked via sensor electrodes 19. The frame 21 is suspended by torsional springs 22 so that it can move about an axis in the rigid chip frame 6. The chip frame 6 is part of the MEMS wafer 7. The moveably suspended frame 21 represents the scanning element and can be deflected via drive electrodes 23. The tilt of this frame 21 can be monitored capacitively by electrodes 24.

Figure 8:
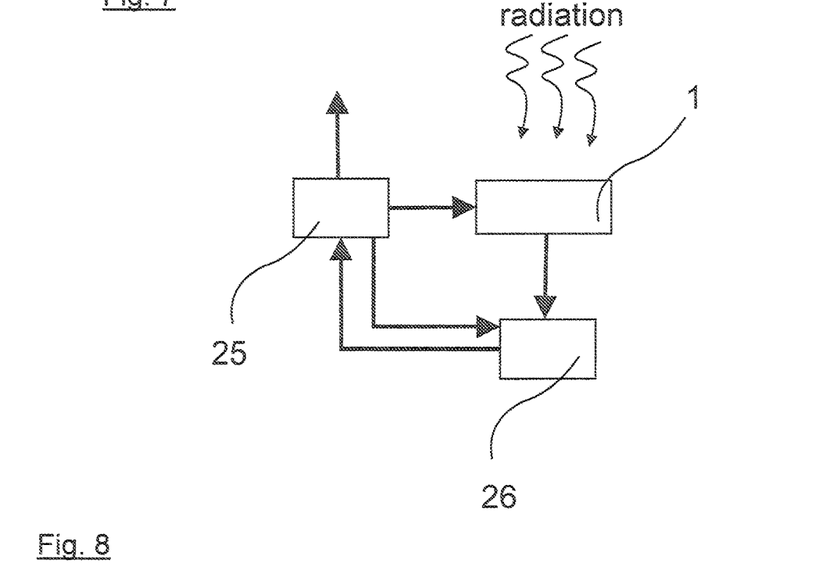
FIG. 8 an example of a configuration of the detection device of the proposed radiation sensor.

Finally, FIG. 8 shows a schematic illustration of the generation of the sensor output signal. The signal generation unit 25 produces one or a plurality of control signals that are fed to the radiation sensor 1. The radiation incident on the radiation sensor 1 results in a small shift in the resonance frequency of the resonator structure 2, not shown here. This results in a change to the phase difference of the resonator oscillation that is detected by the sensor structures 19 (not shown here). The regulator 26 compares the current phase shift with the target phase shift and sends a control signal corresponding to the difference to the signal generation unit 25, in order to thereby cause an adaptation of the control frequency such that the resonator structure remains in resonance and the target phase difference is again obtained. The modified control signal serves at the same time as a measure of the incoming radiated power and can be post-processed, for example in a separate arithmetic unit, and by taking into account the position signals supplied by the scanner 14 or the mobile frame 21, reconstructed to form an image.

Figure 9:
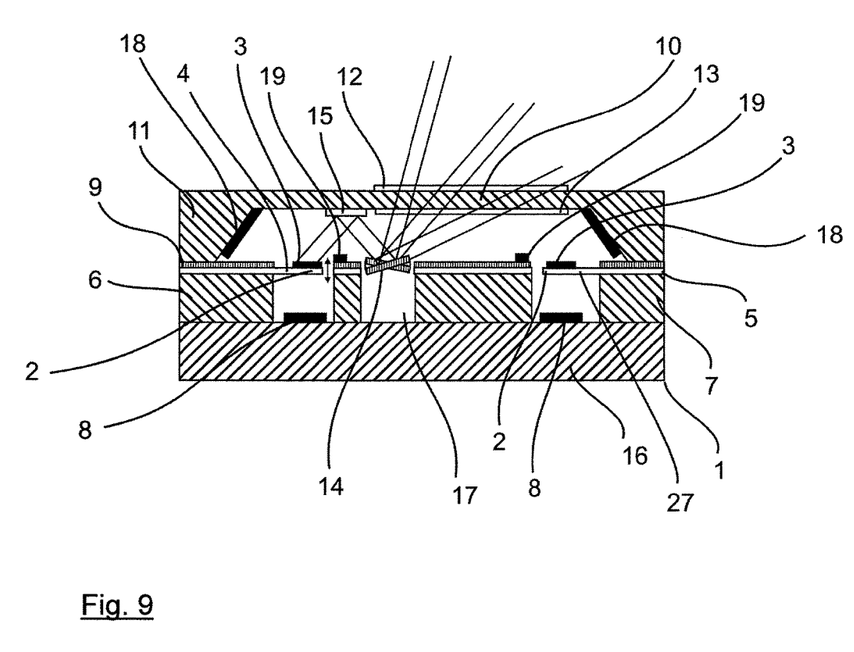
FIG. 9 a further example of a configuration of the proposed radiation sensor in cross-section.

FIG. 9 shows a further example of a configuration of the proposed radiation sensor, in which a reference sensor is additionally implemented in the cavity with the detection element and the scanning element. The configuration of FIG. 9 differs from the configuration of FIG. 1 essentially due to the arrangement of this additional reference sensor. The additional elements are accordingly labelled with identical reference numerals to those in FIG. 1. The reference sensor 1 in this configuration, like the detection element, is formed by a radiation-sensitive resonator structure 27, which has an absorber 3 that is mounted on a thermally and electrically insulating mechanically elastic spring structure 4. This spring structure 4 is produced from the insulation layer 5. The oscillation-capable spring structure 4 is clamped on one side in the rigid chip frame 6. The radiation-sensitive resonator structure 27 is also set into resonance by electrostatic forces. To this end, a control electrode 8 is located underneath the resonator structure 27. The reference sensor serves to detect the background radiation present in the cavity and the chamber or cavity temperature, and is therefore arranged outside of the beam path of the radiation to be detected with the detection element. The variation in the resonance oscillation induced by the background radiation and the chamber temperature are detected capacitively via a suitably positioned sensor electrode 19.

REFERENCE LIST

1 Infrared radiation sensor
2 Resonator structure
3 Absorber
4 Spring structure
5 Insulation layer
6 Chip frame
7 MEMS substrate
8 Control electrode
9 Functional layer
10 Window
11 Cover substrate
12 Anti-reflection coating
13 Anti-reflection coating
14 MEMS mirror
15 Deflecting mirror
16 Base substrate
17 Cavity/chamber
18 Getter material
19 Sensor electrode
20 Lens
21 Frame
22 Torsional springs
23 Drive electrodes
24 Monitoring electrode
25 Signal generation unit
26 Regulator
27 Resonator structure for reference detector

The invention claimed is:

1. An imaging radiation sensor comprising
at least one detection element implemented on a MEMS substrate as a micromechanical resonator configured to absorb radiation,
at least one excitation device adapted to set the at least one detection element into resonant oscillation,
at least one detection device configured to detect a shift in the resonance frequency of the detection element occurring upon absorption of the radiation,
a scanning device with a single-axis or multi-axis tiltable scanning element so as to detect radiation from different directions with the detection element,
a base substrate bonded to a side of said MEMS substrate opposite said at least one detection element; and
a cover substrate bonded to the MEMS substrate, wherein the MEMS substrate is bonded onto the base substrate so that the cover substrate, the MEMS substrate and the base substrate form a hermetically sealed cavity with the at least one detection element and the scanning element arranged within the hermetically sealed cavity,
wherein the excitation device comprises as least one electrode configured to set the detection element into resonant oscillation via electrostatic forces, and
wherein the detection device comprises a sensor electrode configured to capacitively detect the shift of the resonance frequency of the detection element.

2. The radiation sensor according to claim 1,
characterized in
that the scanning element is formed by a frame which is suspended so as to tilt and wherein the detection element is fixed on the scanning element.

3. The radiation sensor according to claim 1,
characterized in
that the scanning element is implemented as a mirror element, by means of which the detected radiation is aimed directly or via one or a plurality of deflection elements onto the detection element.

4. The radiation sensor according to claim 1,
characterized in
that at least one reference detection element with a further excitation device and a further detection device is arranged in the cavity, wherein the reference detection element does not lie in the beam path of the detected radiation.

5. The radiation sensor according to claim 1, characterized in
   that the detection element and the scanning element are implemented on a common substrate.
6. The radiation sensor according to claim 1, wherein the base substrate, the MEMS substrate with the at least one detection element and the scanning element and the cover substrate are connected together.
7. The radiation sensor according to claim 1, characterised in
   that the cavity contains a getter material.
8. The radiation sensor according to claim 1, characterized in
   that the detection element is formed by a mechanically elastic spring element which is suspended or clamped on one side or on two sides.
9. The radiation sensor according to claim 1, characterized in
   that the detection element is formed by a mass suspended via one or a plurality of torsional springs.
10. The radiation sensor according to claim 1, characterized in
    that the detection arrangement comprises a phase-locked loop for regulating the micromechanical resonator, with which the resonator is maintained at resonance.
11. The radiation sensor according to claim 1, characterized in
    that the radiation sensor comprises a plurality of the detection elements with excitation device and detection device, which are arranged on the MEMS substrate as a one-dimensional or two-dimensional array.

* * * * *